United States Patent [19]

Fong et al.

[11] Patent Number: 4,568,721

[45] Date of Patent: Feb. 4, 1986

[54] STARCH CATIONIZATION

[75] Inventors: Dodd W. Fong, Naperville; Ann M. Halverson, Wheaton, both of Ill.

[73] Assignee: Nalco Chemical Company, Oak Brook, Ill.

[21] Appl. No.: 718,687

[22] Filed: Apr. 1, 1985

[51] Int. Cl.[4] .................. D21H 3/12; D21D 3/00; C08L 3/04

[52] U.S. Cl. .................. 525/54.26; 525/54.24; 536/45; 162/164.6; 162/175

[58] Field of Search .............. 525/54.2, 54.24, 54.26; 162/164.6, 175; 536/45, 102

[56] References Cited

U.S. PATENT DOCUMENTS 3,284,393 11/1966 Vanderhoff .................. 524/801
3,625,746 12/1971 Ayukawa et al. ............ 525/54.26
3,738,945 6/1973 Panzer .......................... 528/405
4,097,427 6/1978 Aitken .......................... 527/312
4,251,651 2/1981 Kawakami et al. ............ 162/164.6

Primary Examiner—John Kight
Assistant Examiner—Nathan M. Nutter
Attorney, Agent, or Firm—John G. Premo; Donald G. Epple

[57] ABSTRACT

The invention relates to an improved cationic starch. This starch is composed of a major portion of starch which has been modified with a water-soluble cationic polymer comprising at least 10 mole percent of the dimethyl sulfate or the methyl chloride quaternary ammonium salt of 1-acryloyl-4-methyl piperazine. The invention also contemplates using such cationic starches to modify papers and the improved papers so treated.

8 Claims, 2 Drawing Figures

STARCH CATIONIZATION

INTRODUCTION

Cationic starches are well known and have been used for a variety of purposes. These starches are often prepared by reacting starch using alkaline conditions and elevated temperatures with a variety of cationic compounds. These modified starches are used primarily in the preparation of paper products. They tend to be substantive to the fibers and provide paper having improved properties. One of the properties imparted to papers treated with cationic starches is an improved mullen strength which indicates an improved paper having greater dry strength.

The present invention relates to a new class of cationic starches prepared by cooking, under alkaline conditions, certain polymers with starch. These starches, when used to treat paper products during their manufacture, impart to the paper improved dry strength.

THE DRAWINGS

THE INVENTION

Figure 1:
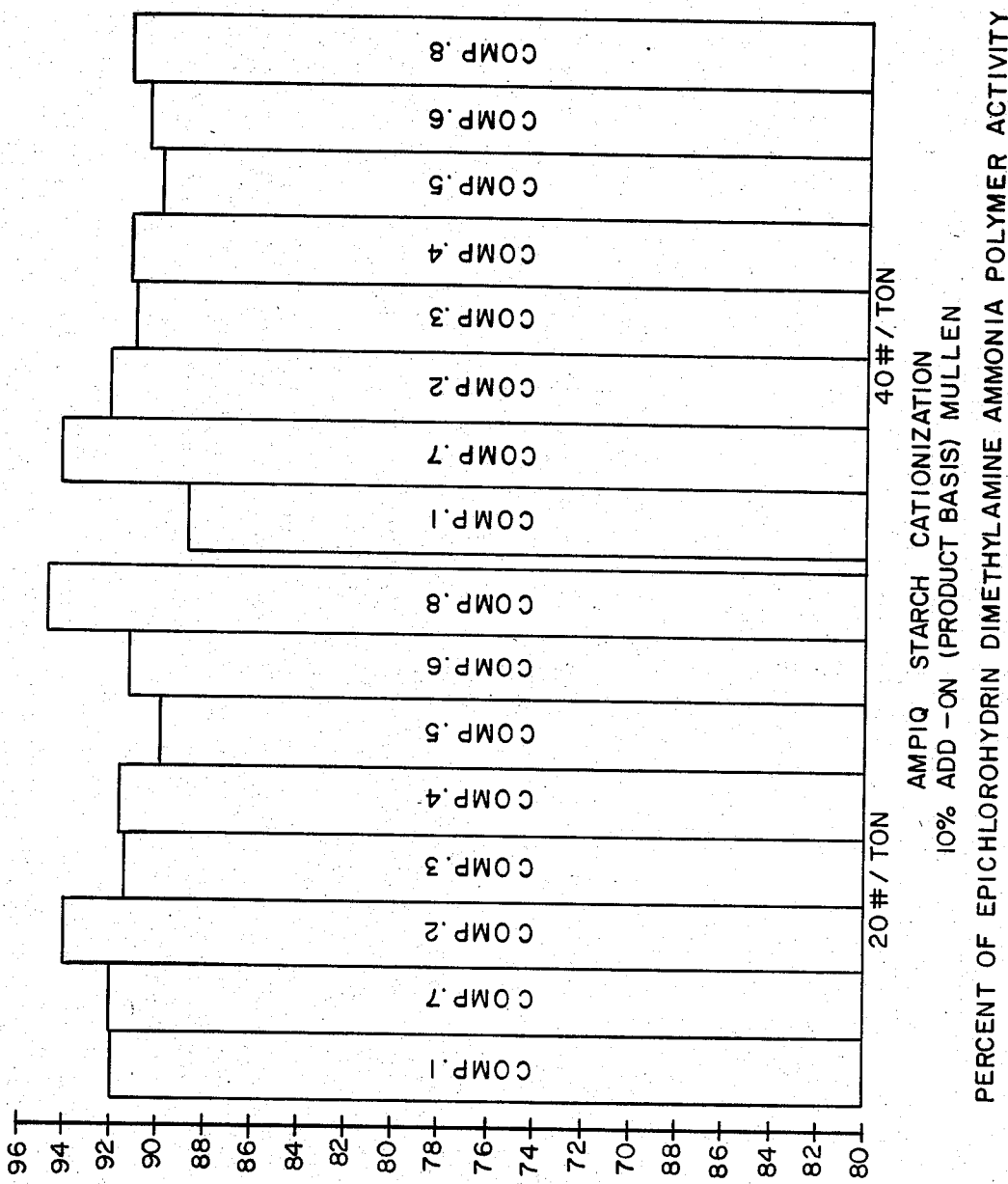
FIG. 1 illustrates that less AMPIQ is required to obtain the same activity as the dimethylamine, epichlorohydrin ammonia polymers.

The invention is a cationic starch comprising a major portion of a starch which has been modified with a water-soluble cationic polymer comprising at least 5.0 mole percent of the dimethyl sulfate or the methyl chloride quaternary ammonium salt of 1-acryloyl-4-methyl piperazine (AMPIQ). These polymers preferably have an Intrinsic Viscosity of at least 0.1 and preferably 1 or more.

The starting vinyl monomer used to prepare the ammonium salts is 1-acryloyl-4-methyl piperazine. This monomer is quaternized with appropriate amounts of methyl chloride or dimethyl sulfate. To prepare the starting non-quaternized monomer, acryloyl chloride is reacted with N-methylpiperazine.

The monomers may be either homopolymerized or may be copolymerized with other vinyl addition monomers capable of being polymerized with the monomers of this invention. The type and amount should be selected to produce water-soluble polymers. A particularly useful water-soluble copolymer may be prepared by polymerizing the cationic monomers with acrylamide.

The comonomers may be either nonionic, cationic, or anionic. Examples of suitable nonionic monomers include: acrylamide, methacrylamide, acrylonitrile, vinyl acetate, lower alkyl acrylates, lower alkyl methacrylates, N-alkyl acrylamides, styrene, etc. Examples of suitable anionic comonomers useful in this invention include: acrylic acid, methacrylic acid, itaconic acid, maleic anhydride, acrylamidomethylpropanesulfonic acid, etc. Examples of suitable cationic monomers which may be useful in this invention include: dimethylaminoethylacrylate, quaternary salts of dimethylaminoethylacrylate, dimethylaminoethylmethacrylate, dimethylaminoethylmethacrylate quaternaries, diallyldimethylammonium chloride, methacrylamidopropyltrimethylammonium chloride, N-vinyl pyrrolidinone, vinyl pyridine, N,N-dimethylaminomethylacrylamide, N,N-dimethylaminomethylmethacrylamide, N,N-dimethylaminomethylacrylamide quaternaries, etc.

As indicated, when the copolymers of the invention are used to modify starch, it is preferred to use the acrylamide copolymers which contain between 5–100 mole percent of AMPIQ. As indicated, the starch is modified with the polymers of the invention by reacting the starch as an aqueous slurry at elevated temperatures at an alkaline pH with from as little as 1% up to as much as 20% by weight based on active polymer. The starch concentration in the slurry usually ranges between 1–10% by weight. A typical reaction condition would be the use of temperatures of about 165° F. using 5% sodium hydroxide based on starch. The reaction time would be at least 10 minutes. While this is presented to show a typical reaction environment for preparing the modified starches, other pH's, temperatures, and times for cooking the polymers with the starch may be used. Such conditions are set forth in Aitken, U.S. Pat. No. 4,097,427.

As indicated, the starches may be used to treat papers to provide a finished paper product having improved dry strength.

The amount of starch used to treat a pulp based on solids present in the pulp may vary from as little as ½ lb./ton depending upon the particular cationic starch employed, the nature of the paper, and the end result sought to be achieved. Typical dosages range between 1–15 lbs./ton.

EXAMPLES

To illustrate the preparation of the polymers, the following are given by way of example:

EXAMPLE 1

1-Acryloyl-4-methyl piperazine

A mixture of acryloyl chloride (102.0 g, 1.13 moles) in methylene chloride (100 ml) was added dropwise into a solution of N-methyl piperazine (86.0 g, 0.86 moles) in methylene chloride (450 ml) over a period of one hour. During the addition, the temperature of the N-methyl piperazine/methylene chloride solution was kept below 25° C. After the addition was complete, the reaction mixture was stirred at room temperature for two hours. The reaction mixture was neutralized with 260 g of 17% sodium carbonate solution. The organic layer containing the crude product was separated from the aqueous layer via a separatory funnel. The aqueous layer was washed well with methylene chloride. Combination of the organic phases and rotoevaporation of the solvent yielded 100.0 grams of crude product. Distillation of the crude product yielded a fraction (74°–78° C.,/5 mm Hg) that was >98.0% pure by G.C. analysis. $^{13}$C NMR and IR analysis gave spectra consistent with the title compound.

EXAMPLE 2

Quaternization of 1-acryloyl-4-methyl piperazine

Dimethyl sulfate (23.2 g) was added slowly into an AMPIP (30.0 g), water (51.8 g) mixture. The temperature of the reaction mixture was kept below 30° C. After complete addition, the reaction mixture was stirred for 2 hours. A $^{13}$C NMR spectrum was consistent with the title compound.

Into a 300 ml Parr bomb was charged 26.6 g. water, 21 g. 1-acryloyl-4-methyl piperazine, and 10 g. methyl chloride. The valves were closed and the bomb was heated to and maintained at 60° C. for 2½ hours. The product was characterized by $^{13}$C NMR.

As will be shown hereinafter, the polymers are conveniently prepared using either solution polymerization or the so-called "inverse emulsion polymerization" method which utilizes polymerization of water-soluble vinyl monomers in the form of water-in-oil emulsions. This technique is described in Vanderhoff, U.S. Pat. No. 3,284,393, the disclosure of which is incorporated herein by reference.

A typical polymerization using the so-called "inverse emulsion" technique is set forth below as Example 3.

EXAMPLE 3

Water-in-Oil Emulsion Polymerization of Acrylamide and AMPIPQUAT

| Oil Phase: | |
|---|---|
| LOPS[1] | 130.0 g |
| Sorbitan Monooleate | 7.5 g |
| 4 Moles EO reacted with Sorbitan Monostearate | 2.5 g |
| Aqueous Phase: | |
| 50% AMPIP MSQ[2] | 51.25 g |
| 46.4% Acrylamide solution | 246.49 g |
| H$_2$O | 49.92 g |
| Ethylene diamine tetra-acetic acid | .05 g |
| Initiator: | |
| 2,2'-Azobisisobutyronitrile | .28 g |

[1]LOPS = A low odor paraffin solvent.
[2]AMPIP MSQ = 1-acryloyl-4-methyl piperazine dimethyl sulfate quaternary ammonium salt.

The oil and the aqueous phases (pH 5) were first prepared and the emulsion was obtained by adding the aqueous solution into the LOPS solution with vigorous stirring.

The emulsion was purged with nitrogen for ½ hour and while heating at 45° C., the initiator was added. The reaction was maintained at 45° C. for four hours and at 65° C. for one hour. The reaction was cooled to room temperature. Gas chromatographic analysis of the residual monomer showed the polymerization to be 74% complete. The intrinsic viscosity of the copolymer was 7.0.

A typical solution polymerization used to produce a homopolymer of the invention is set forth below in Example 4.

EXAMPLE 4

The following reagents were placed into a reaction flask:

| | Wt. % |
|---|---|
| 2% ethylene diamine tetra-acetic acid | 1 |
| 50% AMPIQ, methyl sulfate quat | 20 |
| H$_2$O | 74.8 |

This solution was heated to 45° C. with nitrogen purge for 0.5 hrs. The initiator, 2,2'-Azobis (2-amidinopropane) hydrochloride was added (4 grams of a 3.75% solution of the initiator in H$_2$O). The solution was maintained at 45° C. for 4 hours. To reduce the level of unreacted monomer, an additional 1 hour of heating at 65° C. was required. The intrinsic viscosity of the resulting material was 2.4.

Typical cationic polymers used in the practice of the invention which were prepared by solution polymerization are shown in Table I.

To illustrate the preparation of a cationic starch modified with the polymers described above, the following method was used:

The starch used was Globe 3005 unmodified corn. It was jet cooked with 5% NaOH based on starch. The cationizers were added to a 2.1% starch solution. These were kept at 150° F. for 15 minutes before using. The fiber furnish used was a 50/50 blend of bleached softwood kraft and bleached hardwood kraft refined to a freeness of 450–500 Canadian.

Sheets were prepared on a Semi-Automatic British Sheet Mold. Dried sheets were conditioned for 12 hours at 50% relative humidity and 72° F. before testing.

Figure 2:
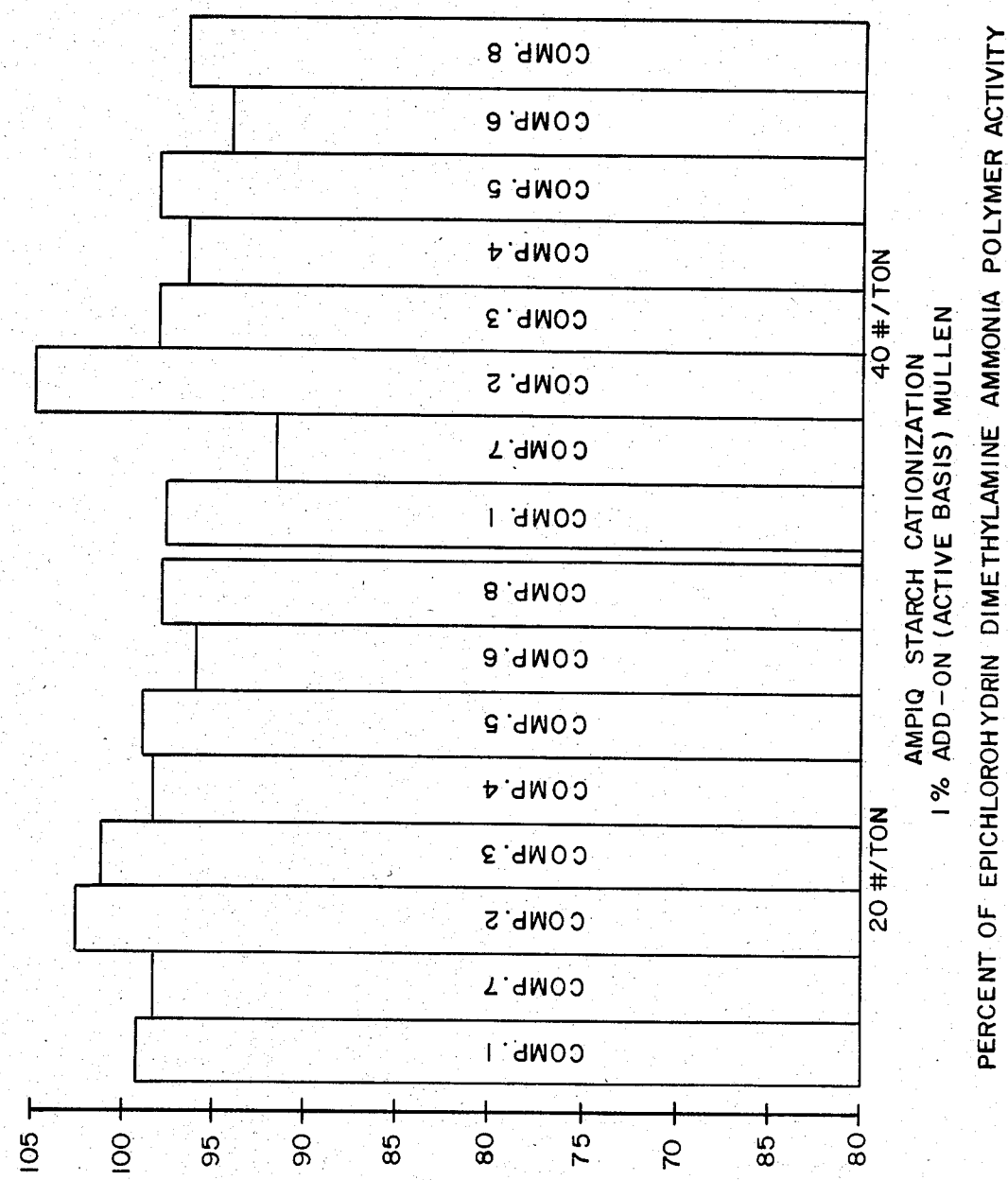
FIG. 2 illustrates that AMPIQ can be used as a replacement for dimethylamine, epichlorohydrin copolymers in starch cationization.

Using the above described test method, the polymers in Table I were used to modify starch using a 1% actives and 10% product basis. They were compared against a commercial cationic starch which had been modified using quaternary ammonium polymers of epichlorohydrin dimethylamine and ammonia of the type described in Panzer, U.S. Pat. No. 3,738,945. These results are shown in FIGS. 1 and 2.

TABLE I

| Comp. No. | Composition | Wt. % Polymer | Intrinsic Viscosity |
|---|---|---|---|
| 1 | AMPIQ | 9.8 | .5 to .8 |
| 2 | 10 mole % AMPIQ 90 mole % Acrylamide | 4.7 | 4.0 |
| 3 | 20 mole % AMPIQ 80 mole % Acrylamide | 5 | 4.0 |
| 4 | 30 mole % AMPIQ 70 mole % Acrylamide | 5 | 5.6 |
| 5 | AMPIQ | 10 | 1.8 |
| 6 | AMPIQ | 10 | 1.4 |
| 7 | AMPIQ | 9.5 | 1.0 |
| 8 | AMPIQ | 10 | 2.4 |
| 9 | DMA/Epi/NH$_3$ | 48 | 2 |

We claim:

1. A cationic starch comprising a major portion of a starch which has been modified by reacting it as an aqueous slurry at elevated temperatures at an alkaline pH with a water-soluble cationic polymer comprising at least 10 mole percent of the dimethyl sulfate or the methyl chloride quaternary ammonium salt of 1-acryloyl-4-methyl piperazine.

2. The cationic starch of claim 1 where the polymer is the homopolymer of either the dimethyl sulfate quaternary or the methyl chloride quaternary of 1-acryloyl-4-methyl piperazine.

3. The cationic starch of claim 2 where the homopolymer is the dimethyl sulfate quaternary ammonium salt of 1-acryloyl-4-methyl piperazine.

4. The cationic starch of claim 1 where the polymer is a copolymer of acrylamide and from 5.0–99.9 mole percent of either the dimethyl sulfate quaternary or the methyl chloride quaternary of 1-acryloyl-4-methyl piperazine.

5. Paper which contains from 1–20% by weight of the cationic starch of claim 1.

6. Paper which contains from 1–20% by weight of the cationic starch of claim 2.

7. Paper which contains from 1–20% by weight of the cationic starch of claim 3.

8. Paper which contains from 1–20% by weight of the cationic starch of claim 4.

* * * * *